US008661705B2

(12) United States Patent
Hackl et al.

(10) Patent No.: US 8,661,705 B2
(45) Date of Patent: Mar. 4, 2014

(54) METHOD FOR PRODUCING A POLYMER MATERIAL FILLED WITH LONG FIBERS

(75) Inventors: Manfred Hackl, Linz-Urfahr (AT); Klaus Feichtinger, Linz (AT); Gerhard Wendelin, Linz (AT); Walter Reisinger, Laakirchen (AT)

(73) Assignee: EREMA Engineering Recycling Maschinen und Anlagen Gesellschaft m.b.H, Ansfelden (AT)

( * ) Notice: Subject to any disclaimer, the term of this patent is extended or adjusted under 35 U.S.C. 154(b) by 0 days.

(21) Appl. No.: 13/574,234

(22) PCT Filed: Jan. 17, 2011

(86) PCT No.: PCT/AT2011/000027
§ 371 (c)(1),
(2), (4) Date: Nov. 19, 2012

(87) PCT Pub. No.: WO2011/088487
PCT Pub. Date: Jul. 28, 2011

(65) Prior Publication Data
US 2013/0055583 A1 Mar. 7, 2013

(30) Foreign Application Priority Data
Jan. 20, 2010 (AT) .................................. A 72/2010

(51) Int. Cl.
*F26B 7/00* (2006.01)
(52) U.S. Cl.
USPC ............... 34/381; 34/413; 428/182; 229/930; 524/498
(58) Field of Classification Search
USPC ........... 34/380, 381, 406, 413, 417; 428/34.5, 428/152, 182, 220; 229/930; 524/498, 446, 524/447, 451
See application file for complete search history.

(56) References Cited

U.S. PATENT DOCUMENTS

| 5,428,123 | A  | * | 6/1995 | Ward et al. ...................... 528/28 |
| 5,508,072 | A  | * | 4/1996 | Andersen et al. ............ 428/34.5 |
| 5,934,168 | A  | * | 8/1999 | Feichtinger et al. ................ 87/8 |
| 6,547,912 | B2 | * | 4/2003 | Enlow et al. ............. 156/244.23 |
| 8,216,506 | B2 | * | 7/2012 | Takakura et al. ............. 264/330 |
| 2004/0077499 | A1 | * | 4/2004 | Graham et al. ................ 504/127 |
| 2009/0093361 | A1 | * | 4/2009 | Sakatani et al. .............. 502/309 |
| 2009/0130377 | A1 |   | 5/2009 | Samanta et al. |
| 2013/0055583 | A1 | * | 3/2013 | Hackl et al. ..................... 34/380 |

FOREIGN PATENT DOCUMENTS

| AT | 2 025 484 A1 | 2/2009 |
| WO | 02/00408 A2 | 1/2002 |
| WO | 2006/079128 A1 | 8/2006 |
| WO | 2011/029904 A1 | 3/2011 |

OTHER PUBLICATIONS

International Search Report mailed on Apr. 28, 2001 for PCT Patent Application No. PCT/AT2011/000027, 3 pages.

* cited by examiner

*Primary Examiner* — Steve M Gravini
(74) *Attorney, Agent, or Firm* — Kilpatrick Townsend & Stockton LLP

(57) ABSTRACT

The present invention relates to a method for producing a polymer material filled with longer fibers, wherein the fibers, which typically have a residual moisture content of approximately 5 to 8% and a minimum length of more than 2 mm, and the carrier material are mixed and heated in a reactor or cutter-compacter, constantly moving them and optionally comminuting the carrier material, and constantly maintaining the pourability and/or lumpiness. According to the invention, the conditions, and particularly the temperature, in the reactor are adjusted so as to dry the fibers to the lowest residual moisture possible, at which the fibers are just barely sufficiently flexible so as not to break during processing in the reactor, or during an optionally following compression step, for example extrusion.

19 Claims, No Drawings

METHOD FOR PRODUCING A POLYMER MATERIAL FILLED WITH LONG FIBERS

The present invention relates to a method according to the preamble of claim 1 and to a use of a device for carrying out the method according to claim 14.

This application is a U.S. National Phase under 35 USC 371 of PCT Application No. PCT/AT2011/000027 filed Jan. 17, 2011, which claims priority to the Austrian Application No. A 72/2010, filed Jan. 20, 2010, the disclosures of which are incorporated by reference herein.

Fillers are mixed with different carrier materials in a variety of ways. Thermoplastic resins are known from the prior art, for example, as conventional carrier materials.

A filler that is used increasingly for different applications is natural wood in the form of wood dust or short wood chips. In addition, paper and pulp fibers are used as fillers for changing the properties of plastic materials or resins. These wood materials are presently used consistently with a fiber length of less than 2 mm.

In addition to these fillers or fibers, in general industrially produced ligneous fibers are also available, for example fibers made of palm trees, fibrous grasses such as bamboo, hemp, sisal, and the like. The term 'wood' should be understood here in the figurative sense. These industrially produced fibers have a larger length and consistently have a length of more than 5 mm, and preferably even a fiber length between 10 and 20 mm. A variety of methods are available to produce such technical fibers in a uniformly reproducible and cost-effective manner.

The advantage of a larger fiber length is that these longer fibers have considerably better mechanical properties, for example for finished products such as profiles, panels and the like, than is the case with short ligneous fibers under 2 mm in length. As a result, there is a practical need to manufacture products from materials having the longest possible fibers.

However, such materials comprising long fibers are relatively difficult to produce. While the production of carrier materials comprising short fibers of less than 2 mm in length generally does not lead to technological difficulties, even during extrusion, admixing longer fibers having a length of, for example, more than 5 mm in the extruder results in very poor feeding or metering behavior of the extruder, for example in the case of single-screw extruders, but also twin-screw extruders. This leads either to limited throughput, or it may even be entirely impossible to introduce any significant amounts of the long fibers into the carrier material.

The addition of fibers in a range of 10 to 90% by weight may be desirable, and the number will vary depending on the application. If no thermoplastic polymer is or can be employed as the carrier material or binding agent, and a thermoset material or a resin is used as the carrier material, some application cases may require a fiber content of more than 70%, and particularly between 80 and 90%. In particular when the amount of longer fibers is this high, feeding into the extruder is very critical and efficiency is impaired, if not impossible, due to poor feeding behavior.

A further problem is the (water) moisture that is introduced into the system by way of the fibers. Fibers, as all fillers, have a relatively large surface, on which accordingly large amounts of residual moisture can deposit.

High residual moisture, however, extremely impairs the final compression step at elevated temperatures, for example during extrusion, and additionally limits the throughput and lowers the product quality. For example, when extruding a carrier material fed with wood dust, the wood dust requires very intensive and complex pre-drying so as to achieve sufficient throughput rates at all, for example in twin screws. If the moisture level is too high, the extruder degassing operation becomes overburdened, which may result in material loss or complete stopping of the machine.

In this connection, an additional problem arises when processing hygroscopic carrier materials and/or carrier materials sensitive to hydrolytic degradation, such as polycondensates like polyesters, and notably PET. In these carrier materials, too much residual moisture in the receiving container, in particular at elevated temperatures, results in hydrolytic degradation of the polymer chains and worsening of the quality of the resulting material or of the end product. For this reason, the moisture level must be kept particularly low especially in these instances.

However, it must also be taken into consideration that any kind of pre-drying means an added step and that additional pre-drying requires both time and energy.

On the other hand, it must also be considered that the residual moisture present on the fibers is certainly important and represents a kind of lubricant or maintains the flexibility of the fibers. This is crucial for processing. For example, if the crude fibers are dried too much, or dried almost completely, before they are added or processed, the fibers are very brittle and break very easily, even under low mechanical stress, which is to say during processing in the cutter-compacter, however at the latest during extrusion. As a result, the fiber lengths are shortened and the qualitative properties of the end product are lowered, because the content of long fibers, for example of fibers having a length of more than 5 mm, is dramatically reduced, or only short fibers having a length of less than 2 mm are present in the end product.

The residual moisture of the crude fibers that are used therefore must not be too high, because at the latest during extrusion this would negatively impact the carrier material or the polymer, or the extrusion behavior. On the other hand, the residual moisture also must not be too low, because otherwise the fibers would break during processing and, once again, only short fibers and therefore a qualitatively more disadvantageous end product would be obtained.

It is therefore the object of the invention to create a method for producing a polymer material that is filled with longer fibers having a certain minimum length, wherein the method also provides high throughput rates and a qualitatively premium end product, in which notably the original larger length of the fibers has been preserved.

This object is achieved by the characterizing features of claim 1.

In the method according to the invention for producing a polymer material filled with longer fibers, the fibers, which typically have residual moisture of approximately 5 to 8%, having a minimum length of more than 2 mm and the carrier material are mixed and heated in a reactor or cutter-compacter, constantly moving them and optionally comminuting the carrier material, and constantly maintaining the pourability and/or lumpiness.

The movement is important because in this way the material is prevented from agglomerating or conglutinating. Intensive movement is required in particular for thermoplastic resins, because plastic materials soften at elevated temperatures and become sticky and would agglomerate or bake together in the absence of constant mixing and stirring. Mixing is thus also used to maintain the raw material in the receiving container or reactor in a pourable and lumpy state, even at elevated temperatures.

The increased temperature is used to bring the carrier material into a softened or sticky state, thereby facilitating the coupling of the fibers to the carrier material. In general, the material is not melted yet. The increased temperature thus ensures more intimate mixing of the fibers and carrier material and, additionally, the mixture is prepared for a subsequent further compression step, notably the extrusion process.

An increase in the temperature also causes certain drying of the carrier material and of the fibers, which, as has been noted above, is required to ensure the throughput of the extruder and safeguard the quality of the material. In this way, a certain amount of residual moisture is removed and the fibers are dried by the increased temperature.

The applicant has recognized that very specific conditions have to be adjusted in the reactor to ensure the method to be successful.

The fibers as well as the carrier material should be dried to the lowest residual moisture possible. However, this drying process must be stopped in time, or must not result in complete drying of the fibers, and instead may only continue until the fibers are just barely sufficiently flexible or pliable so as not to break during processing in the reactor, and an optionally following compression step in the extruder.

In this way, it is ensured that the fibers are reasonably dry and introduce no interfering moisture into the extruder, yet remain sufficiently flexible so as not to break. As a result, the lengths of the fibers are preserved, and the desired end products exhibit the qualitative advantages—which can only be yielded with long fibers.

This requires careful weighing of two opposing requirements, these being the drying process on the one hand, and the fiber length on the other. The applicant has recognized that the problem known from the prior art can be solved in this way, or by adhering to the characteristics of the method and device described above.

Using the method according to the invention, it is also possible to treat the fibers directly in the reactor, which is to say in a single operation, simultaneously with the carrier material, so that the mixing and drying can be carried out in a common step. In this way, the need to previously dry the crude fibers in a separate step is eliminated, thereby making the method more efficient and energy-saving.

In the manner according to the invention, it is therefore possible, using a fast method, to reliably control how the fibers must be dried, or when the end of the drying process has been reached, and in this way the degree of drying can advantageously be correlated with the mixing intensity or the adjustment of the temperature that is required.

Using the method according to the invention, the fibers are incorporated into a carrier material as gently as possible, preserving the lengths thereof, without breaking the fibers. It is possible in this way to obtain a carrier material, using the advantageous method, in which fibers having large lengths are embedded, wherein the fibers are uniformly distributed in the carrier material and the fibers are present in the full lengths thereof, to the extent possible, and not in the form of fragments or segments.

Further advantageous embodiments of the method will be apparent from the characteristics of the dependent claims.

According to an advantageous embodiment of the method, the fibers are dried to a residual moisture content of 1 to 2%. This leaves less moisture in the product, yet the fibers remain sufficiently flexible.

It is particularly advantageous when at least one mixing and/or comminuting tool, which is optionally disposed on several superimposed planes and can revolve or rotate in particular about a vertical axis and which comprises working edges that have a mixing and optionally comminuting effect on the material, is used in the reactor in order to mix and heat the carrier material or the fibers, wherein the heating takes place at least in part, and particularly entirely, by mechanical energy or friction acting on the material. The adjustment of the parameters can be controlled particularly well using such a device.

According to a further embodiment of the method, it is advantageous when the mixing tools stuff, or push by way of force-feeding, the carrier material, or the mixture, in a spatula-like manner into a housing of a discharge unit directly connected to the reactor, preferably a screw conveyor, a barrel extruder, a twin screw or the like, while constantly maintaining the pressure or density and the pourability and/or lumpiness of the material. For example, if conveying were to take place into an open hopper, the density would be lost and the material would immediately cake. Uniform feeding into the extruder would then no longer be ensured.

Surprisingly, it has been found that the method according to the invention can be carried out in a particularly preferred manner using a cutter-compacter and extruder combination known from the prior art, wherein the extruder is directly connected to the lower region of the reactor. Using such a device, it is possible in a very simple manner to gently introduce fibers having large lengths into a carrier material, without breaking them. Here, a variety of advantages of this combined system are utilized. For example, the mixing tools in the reactor force-feed the extruder. Depending on the application, the downstream screw can be configured as a complete extruder screw, which depending on the mixture converts the processed material either into granules or into an end product, such as a plate or a profile. Using this device, it is ensured that not only good mixing of the fibers and the carrier material is achieved, but also that the mixture undergoes a certain level of pre-compression. Maintaining the pourability and the pressure ensures uniform feeding to the directly connected extruder, and in addition the machine is prevented from running partially empty. By reducing the moisture level, further compression all the way to the conversion into a bubble-free melt is possible.

In order to preserve the pourability, it is generally advantageous for the carrier material not to be completely melted. However, it must be possible to soften the carrier materials at least to a certain degree so as to ensure good mixing with the fibers.

Advantageously, a polymer or macromolecular material, and particularly a natural polymer, for example cellulose or lignin, or a synthetic polymer, for example a plastic, and preferably a thermoplastic material, or a non-crosslinked or non-cured thermoset plastic, or a natural or synthetic resin, is used as the carrier material. Possible carrier materials also include, for example, paraffins, waxes, oils and the like.

The advantageous treatment of the polymer carrier material, and particularly of a thermoplastic material, in the reactor is carried out a temperature above the glass transition temperature and below the melting range, and preferably at a temperature at which the material is present in a softened state. To this end, the material is also crystallized, dried and/or purified, or optionally even the viscosity thereof may be increased. The material is preferably heated to a temperature in the range of the VICAT softening point. The VICAT softening temperature can be determined according to DIN ISO 306. The fibers are then admixed to the polymer material that has been pretreated in this way. When the plastic material is present in a softened state, in which the material has not melted yet and the flakes are still present individually, the surface has already been softened and the pores are open. In this way, the carrier material has a very high surface, and the fibers can easily penetrate into the polymer material, making the mixture more uniform.

When using a thermoplastic polymer as the carrier material, the plastic material is advantageously processed at a temperature of 70° to 240°, and preferably 130° to 210°, optionally under a vacuum of 150 mbar, preferably 50 mbar, particularly 20 mbar, and most particularly between 0.1 to 2 mbar, and the plastic materials typically remain in the reactor for a mean residence time of 10 min to 200 min, and particularly 40 min to 120 min.

It is also possible to use a thermoset polymer or resin that has not been cured yet as the carrier material, wherein such resins are used notably when the content of fibers is to be high, particularly more than 70% by weight, and preferably between 80 and 90% by weight. With such fiber contents, feeding into the extruder is particularly critical.

The fibers and the carrier material can be introduced consecutively in any arbitrary sequence into the reactor, wherein when using dusty, fine fibers it is advantageous when the carrier material is added first, and then the fibers. As an alternative, the fibers and carrier material may also be added at the same time.

It is even possible to add a starting material in which the carrier material and the fibers are already intimately amalgamated with each other or present in a common starting product. This case exists, for example, in the case of ligneous fibers, because the ligneous fibers already have the carrier material attached thereon in the form of lignin, and optionally cellulose and/or pectins. As a final step, often a synthetic polymer, such as PP, is added to such a material in the extruder.

According to a further advantageous step of the method, the material is treated in the reactor under vacuum conditions, and particularly in the range of the rough or fine vacuum. This supports the drying process, and the temperature, if necessary, may be kept lower, thereby allowing the method to be carried out under gentler conditions.

According to a further advantageous embodiment of the method, it is possible to add the fibers and the carrier material to the reactor at the same time and then increase the temperature and move the mixture. However, it is also possible to preheat the carrier material in the reactor and, for example, to bring the surface thereof into a softened and sticky state, however care should be taken that the lumpiness of the material is preserved. In this way, dust formation when adding the fibers can be avoided, which is particularly advantageous when using fibers that are hazardous to people's health. In this case, the fibers adhere to the sticky surface of the material immediately after being added. In this connection, it may also be regarded as advantageous that the addition of the fibers is carried out below the level or the mixing element of the revolving material.

The fibers that are used are inorganic or organic fibers, for example.

The lengths of the fibers provide crucial mechanical properties in the end product. It is advantageous for the mechanical properties of the end product, for example, when the lengths of the fibers are more than 2 mm, preferably 5 mm, and particularly between 10 and 20 mm.

The fibers are typically used in a quantity of 10 to 90% by weight, relative to the total weight of the mixture.

The metered addition of the fibers into the reactor can be carried out volumetrically or gravimetrically. The discharge of the mixture from the reactor to the screw can take placed in an uncontrolled or controlled fashion by a downstream melt pump or a fill level measuring unit in the cutter-compactor. The rotational speed of the discharge screw or the extruder is then varied, either by the inlet pressure before the melt pump or the fill level in the cutter-compactor, in such a way that the pressure or the fill level remains constant.

When processing poorly flowing fiber, it has proven to be advantageous to conduct both a gravimetrically metered addition into the cutter-compacter and to withdraw the mixture therefrom in a defined manner. This applies in particular when an end product is being produced, or a downstream extruder is fed the compressed product.

To this end, a variety of embodiments are possible:

It is possible, for example, to compress and feed a separate extrusion system. To this end, a compressed, pourable material having the longest possible fiber length is produced. Optionally, lubricants and other fillers or auxiliary agents may be added. This compressed product is fed, without losing the compression, to a twin screw, for example. There, it is admixed to a polymer, for example polypropylene, at a defined mixing ratio. Then a profile or panel, for example, is directly extruded. It is also possible to extrude the material in an open mold and bring it into a desired shape using a press.

In addition, it is possible to carry out direct extrusion or granulation using a system comprising a reactor or cutter-compacter and an extruder. The mixture from the cutter-compacter or reactor already constitutes an extrudable blend as such or largely corresponds to the final formulation. The material can now be extruded and granulated, or an endless profile can be produced.

According to the invention, the special use of the above device for carrying out the described method is also provided for. This device comprises a reactor or cutter-compacter and a discharge unit connected thereto, preferably a screw conveyor, a barrel extruder, a twin screw or the like, wherein at least one mixing and/or comminuting tool, which is optionally disposed on several superimposed planes and can revolve or rotate in particular about a vertical axis and which comprises working edges that have a mixing and optionally comminuting effect on the material, is disposed in the reactor in order to mix and heat the material. Heating takes place at least in part, and preferably exclusively, by mechanical energy or friction acting on the material. The mixing tools stuff or convey the material, or the mixture, in a spatula-like manner into the housing of the discharge unit connected to the reactor, while constantly maintaining the pressure or density and the pourability or lumpiness of the material.

Surprisingly, it has been found that the required results can be achieved when using such a device and adhering to the parameters of the method.

It is known than fibers having a length of more than 5 mm result in very poor feeding or metering behavior of the extruder. When, according to an advantageous embodiment, the precompressed mixture arriving from the cutter-compacter is force-fed to a connected screw, and just before the extruder, or in the extruder, the temperature is raised to approximately 160° C., the carrier material is given with the necessary flow properties to make the material pasty or deformable. Despite an extrusion process, this method succeeds in generating a uniform three-dimensional fiber structure having an appropriate number of coupling point between the fibers in the workpiece. This structure is essential for a variety of applications, such as in photovoltaics, in fire prevention, for window casement sections, in the automotive industry, or in the aerospace industry. The resins serve as adhesion points between the individual fibers.

It is furthermore possible to carry out the method in a single stage using a single reactor, or in the feeding region of an extruder, or to heat, dry, crystallize and purify the plastic material, which optionally may already have been compounded with the filler, in a single operation, and particularly in a single reactor, and/or to carry out the method with or without pre-drying and/or with or without pre-crystallization of the plastic material.

It is furthermore possible to carry out the method in multiple stages, and particularly in two stages, wherein two or more receiving containers or reactors are connected in series and/or in parallel, and the plastic material to be processed, which optionally may have already been compounded with the filler, consecutively passes through these containers, wherein preferably the conditions of the method according to the above claims are applied to at least one container, and particularly to the container loaded first, or to the pre-treatment, wherein the plastic material preferably is brought to a temperature, in particular close to the process temperature of the primary treatment, in an upstream pre-treatment.

It is furthermore possible for the plastic material to be subjected to the action of mechanical energy in the first stage of a pre-treatment, and notably under vacuum conditions, thereby being heated, and to be dried at elevated temperatures and optionally crystallized at the same time, and subsequently, during a second stage, which may precede an optional plasticizing or melting process, for a primary treatment of the plastic material to be carried out, during which the plastic material is dried, in particular under vacuum conditions, again under the action of mechanical energy and while being stirred, and is further crystallized, wherein this primary treatment is carried out in particular at a temperature that is higher than during the pre-treatment, wherein the temperature of the primary treatment is kept notably below the plasticizing temperature or melting temperature of the plastic material.

The fibers can be fed both in the first container and in the second container. The finished mixtures are then continuously introduced into a further container, where the mixing, the heating to the operating point, and the loading into the extruder are carried out.

It is also possible for the plastic material to undergo the pre-treatment in a continuous flow and/or for the method to be carried out continuously or discontinuously or as a batch process.

The moisture of the fibers can be controlled using water injection integrated in the cutter-compacter. The pressure of the discharge screw and the torque of the discharge screw are used as feedback. The torque of the discharge screw is no longer stable when the moisture level is too high. No uniform transport of the fibers can take place because steam bubbles develop, impairing the transport. If the moisture level is too low, the torque increases due to the lower conveying action as a result of the decreasing sliding friction, and the tool pressure rises because the sliding properties in the tool decrease.

The invention will be explained hereinafter by way of example, and in a non-restricting fashion, using two particularly preferred embodiments:

EXAMPLE 1

Ligneous Fibers with Polypropylene

The method is carried out in a cutter-compacter and extruder combination, which has been known for quite some time from the prior art, such as a VACUREMA® machine. A substantially cylindrical receiving container or cutter-compacter is provided, in the interior of which cutting and mixing tools are mounted rotatably about a vertical axis, ensuring mixing and optionally comminution of the container content. An extruder for melting the polymer is disposed in the lowest region, just above the bottom of the container, or at the level of the lowest mixing tools. The mixing tools are disposed and operated so as to push the material into the extruder by way of force-feeding. The material is thus mixed and heated, however without melting, in the cutter-compacter, and remains there for a certain residence time.

In the present case, the mixing tool rotates at approximately 1500 revolutions per minute. The temperature in the cutter-compacter is approximately 140° C., wherein the temperature is introduced into the material by way of the friction of the mixing tools. The polypropylene is thus in a softened state near the VICAT softening temperature thereof. The material, however, remains present in a lumpy form.

Ligneous fibers having a length of 15 mm and a residual moisture content of 6% by weight are added from above and intimately mixed in.

Both the polypropylene (the polypropylene may take on the form of ground stock of thick-walled products, fibers, nonwoven fabric, or films) and the ligneous fibers are fed continuously at a polypropylene throughput rate of approximately 500 kg/h and a ligneous fiber throughput rate of approximately 200 kg/h. The residence time of the materials in the cutter-compacter is approximately 20 minutes. In the process, the moisture of the fibers is reduced to a content of 1.5%. Subsequently, the intimately mixed material is stuffed into the extruder, where it is melted. It is then processed into the desired end product.

An analysis of the material has shown that only a very small portion of the fibers was broken and more than 95% of the fibers still had lengths of more than 15 mm. In addition, the product quality of the plastic matrix was very good, and notably no bubbles formed or discolorations occurred.

EXAMPLE 2

Ligneous Fibers in Wood (Lignin) with Polypropylene

The method is carried out in a device as in example 1. Comminuted wood, containing lignin and ligneous fibers, among other things, is continuously introduced into the reactor at a throughput rate of approximately 60 kg/h and is processed at a temperature of 124° C. to 128° C. at a speed of the mixing tools of approximately 1900 rpm for a residence time of approximately 15 min. The fibers are dried without breaking.

The material treated in this way is then continuously stuffed into the extruder, where it is mixed into the melted polypropylene.

In this way, ligneous fiber-filled polypropylene is obtained, in which more than 92% of the fibers still have lengths of more than 15 mm.

The invention claimed is:

1. A method for producing a polymer material comprising a carrier material and fibers, comprising:
    introducing the carrier material and the fibers into a reactor or cutter-compacter, wherein the fibers have a minimum length of more than 2 mm;
    mixing and heating the carrier material in the reactor or cutter-compacter;
    constantly moving the carrier material and the fibers;
    constantly maintaining pourability and/or lumpiness of the carrier material and the fibers; and
    adjusting conditions in the reactor or cutter-compacter so as to dry the fibers to a residual moisture content of less than 5%.

2. The method according to claim 1, comprising adjusting the conditions so as to dry the fibers to a residual moisture content of 1 to 2%.

3. The method according to claim 1, wherein the reactor or cutter-compacter comprises at least one mixing and/or comminuting tool, which is configured to rotate about an axis, and which comprises working edges that have a mixing effect on the carrier material and the fibers, wherein the mixing and moving steps are effected at least in part by the tool, and wherein the heating step is effected at least in part by mechanical energy or friction of the tool acting on the carrier material.

4. The method according to claim 3, further comprising pushing the carrier material, with the tool, into a housing of a discharge unit directly connected to the reactor, while constantly maintaining a pressure and/or density and the pourability and/or lumpiness of the carrier material.

5. The method according to claim 1, wherein the carrier material comprises at least one member of the group consisting of: a polymer, a macromolecular material, a natural polymer, cellulose, lignin, a synthetic polymer, a plastic, a thermoplastic material, a non-crosslinked thermoset plastic, a natural resin, and a synthetic resin.

6. The method according to claim 1, wherein introducing the carrier material and the fibers into the reactor or cutter-compacter comprises introducing the fibers and the carrier material consecutively into the reactor or cutter-compacter.

7. The method according to claim 1, wherein introducing the carrier material and the fibers into the reactor or cutter-compacter comprises introducing the fibers into the reactor or cutter-compacter simultaneously with the carrier material.

8. The method according to claim 1, wherein the fibers are 10 to 90% by weight of the polymer material, and wherein the carrier material is a non-cured thermoset resin or an additional polymer material.

9. The method according to claim 1, wherein one of the conditions in the reactor or cutter-compacter is a vacuum condition.

10. The method according to claim 1, wherein the fibers comprise at least one member of the group consisting of: inorganic fibers, glass fibers, graphite fibers, organic fibers, ligneous fibers, fibers made of palm trees, fibers made of bamboo, fibers made of hemp, and fibers made of sisal.

11. The method according to claim 1, wherein the minimum length of the fibers is more than 5 mm.

12. The method according to claim 1, further comprising removing the polymer material from the reactor or cutter-compressor, continuously maintaining a pressure or density and the pourability or lumpiness, and subjecting the polymer material to a further compression step.

13. Use of an apparatus for carrying out the method according to claim 1, the apparatus comprising the reactor or cutter-compacter; a discharge unit connected to the reactor or cutter-compacter; and at least one mixing and/or comminuting tool, configured to rotate about an axis and comprising working edges that have a mixing effect on the carrier material, disposed in the reactor or cutter-compacter in order to mix and heat the carrier material, wherein the heating takes place at least in part by mechanical energy or friction of the tool acting on the carrier material, and wherein the tool is further configured to deliver the carrier material into a housing of the discharge unit, while continuously maintaining a pressure and/or density and the pourability and/or lumpiness.

14. The method according to claim 1, wherein the conditions in the reactor or cutter-compacter comprise a temperature in the reactor or cutter-compacter.

15. The method according to claim 6, wherein introducing the carrier material and the fibers into the reactor or cutter-compacter comprises first adding the carrier material, partially heating the carrier material, and subsequently adding the fibers.

16. The method according to claim 8, wherein the fibers are 70 to 90% by weight of the polymer material.

17. The method according to claim 8, wherein the fibers are 80 to 90% by weight of the polymer material.

18. The method according to claim 1, wherein the minimum length of the fibers is between 10 and 20 mm.

19. The method according to claim 14, wherein the temperature in the reactor is above a glass transition temperature and below a melting range of the carrier material.

* * * * *